United States Patent
Bybell

(10) Patent No.: US 8,135,927 B2
(45) Date of Patent: Mar. 13, 2012

(54) STRUCTURE FOR CACHE FUNCTION OVERLOADING

(75) Inventor: Anthony J. Bybell, Carrboro, NC (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 12/110,123

(22) Filed: Apr. 25, 2008

(65) Prior Publication Data
US 2009/0089506 A1    Apr. 2, 2009

Related U.S. Application Data

(63) Continuation-in-part of application No. 11/863,517, filed on Sep. 28, 2007.

(51) Int. Cl.
*G06F 12/00* (2006.01)
(52) U.S. Cl. .......... 711/156; 711/118
(58) Field of Classification Search .......... 711/118, 711/156
See application file for complete search history.

(56) References Cited

U.S. PATENT DOCUMENTS

| | | | | |
|---|---|---|---|---|
| 5,740,466 | A * | 4/1998 | Geldman et al. | 710/5 |
| 6,615,368 | B1 * | 9/2003 | Dunlap | 714/30 |
| 2005/0132263 | A1 * | 6/2005 | Anderson et al. | 714/766 |
| 2007/0033512 | A1 * | 2/2007 | Johnson | 714/801 |

OTHER PUBLICATIONS

U.S. Appl. No. 11/863,517, Sep. 28, 2007, entitled, "Cache Function Overloading."

* cited by examiner

*Primary Examiner* — Jared Rutz
(74) *Attorney, Agent, or Firm* — Patterson & Sheridan, LLP

(57) ABSTRACT

A design structure embodied in a machine readable storage medium for designing, manufacturing, and/or testing a design is provided. The design structure generally includes a system that includes a cache that stores information in a cache line for processing, wherein the cache line includes at least a first field configured to store an instruction or data and at least a second field configured to store parity information, a parity register that include a parameter indicative a whether parity generation and checking is disabled for the information in the cache line, and a processor that sets the second field in the cache line to include a value, which indicates a corresponding action to be performed, when the parameter in the parity register indicates that parity generation and checking is disabled for the cache line.

16 Claims, 3 Drawing Sheets

STRUCTURE FOR CACHE FUNCTION OVERLOADING

CROSS-REFERENCE TO RELATED APPLICATION

This application is a continuation-in-part of U.S. patent application Ser. No. 11/863,517, filed Sep. 28, 2007, which is herein incorporated by reference.

BACKGROUND OF THE INVENTION

Field of Invention

The following generally relates to design structures, and more specifically, design structures for cache and, more particularly, to cache function overloading.

Cache is used as temporary storage for frequently accessed instructions and/or data. When a cache client such a control processing unit (CPU) wishes to access an instruction or data, it first checks the cache. If a cache line in the cache includes a tag matching that of the desired instruction or data, the instruction or data in the cache line is read and used. Otherwise, the instruction or data is fetched from main memory or a higher level cache and inserted in a cache line and used. Subsequent access to the instruction or data is then provided through the cached copy.

In one instance, when an instruction or data address is marked with a breakpoint, address comparisons between each instruction or data address and pre-stored addresses in an address register are repeatedly performed over a set of debug registers to locate the instruction or data address marked with the breakpoint. For an instruction or data address that matches an address in the address register, when the instruction or data address is read, an interrupt is thrown and the processor switches context and begins execution of an interrupt handler. Since the address comparison is performed for all of the instructions and data addresses, this approach may be relatively slow, depending on the number of instructions and data addresses and/or the number of addresses in the address register.

SUMMARY OF THE INVENTION

In one aspect, a method includes checking a first parameter that indicates whether parity generation and checking for a at least a sub-portion of a cache line is disabled, setting at least one parity bit, corresponding to the sub-portion, in the cache line with a second parameter that indicates an action to perform when the first parameter indicates that parity generation and checking is disabled, passing the at least one set parity bit with the sub-portion to a processor for processing, and performing the action when the sub-portion is processed by the processor, wherein the processor performs the action.

In another aspect, a system includes a cache that stores information in a cache line for processing. The cache line includes at least a first field configured to store an instruction or data and at least a second field configured to store parity information. A parity register includes a parameter indicative a whether parity generation and checking is disabled for the information in the cache line. A processor sets the second field in the cache line to include a value, which indicates a corresponding action to be performed, when the parameter in the parity register indicates that parity generation and checking is disabled for the cache line.

In another aspect, a system includes a cache that stores information in a cache line for processing. The cache line includes at least a first field configured to store an instruction or data, at least a second field configured to store parity information, and at least a third field configured to store a parameter indicative of whether parity generation and checking is enabled for the first field. A processor that sets the second field in the cache line to include a value, which indicates a corresponding action to be performed, when the parameter in the third field indicates that parity generation and checking is disabled.

In another aspect, a design structure embodied in a machine readable storage medium for at least one of designing, manufacturing, and testing a design is provided. The design structure generally includes a system that includes a cache that stores information in a cache line for processing, wherein the cache line includes at least a first field configured to store an instruction or data and at least a second field configured to store parity information, a parity register that include a parameter indicative a whether parity generation and checking is disabled for the information in the cache line, and a processor that sets the second field in the cache line to include a value, which indicates a corresponding action to be performed, when the parameter in the parity register indicates that parity generation and checking is disabled for the cache line.

In another aspect, a design structure embodied in a machine readable storage medium for at least one of designing, manufacturing, and testing a design is provided. The design structure generally includes a system that includes a cache that stores information in a cache line for processing. The cache line may include at least a first field configured to store an instruction or data, at least a second field configured to store parity information, and at least a third field configured to store a parameter indicative of whether parity generation and checking is enabled for the first field. The system may also include a processor that sets the second field in the cache line to include a value, which indicates a corresponding action to be performed, when the parameter in the third field indicates that parity generation and checking is disabled.

BRIEF DESCRIPTION OF THE DRAWINGS

These and other features of this invention will be more readily understood from the following detailed description of the various aspects of the invention taken in conjunction with the accompanying drawings in which.

The drawings are merely representations and are not intended to portray specific elements of the invention. The drawings are intended for explanatory purposes and should not be considered as limiting the scope.

DETAILED DESCRIPTION OF THE EMBODIMENT

Figure 1:
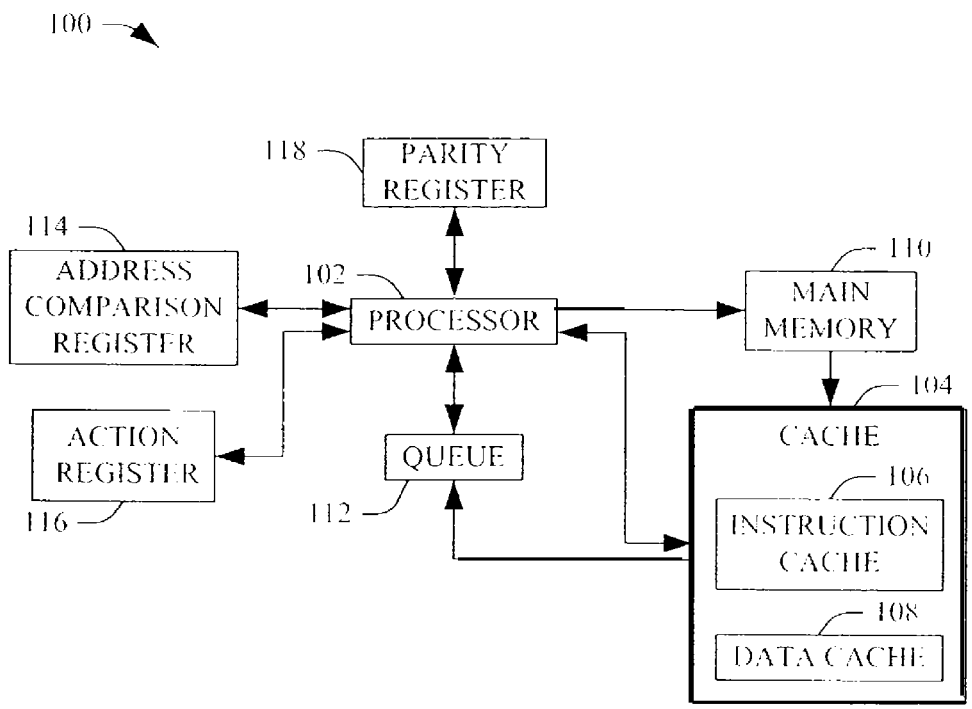
FIG. 1 illustrates a system that overloads a parity bit.

FIG. 1 illustrates part of a computing system 100 such as a computer or other system that includes one or more processors. For sake of brevity and clarity, the illustrated system 100 is shown with a single processor 102. The processor 102 can perform various functions, such as, but not limited to, overloading a cache line parity bit, performing an action associated an overloaded parity bit, executing instructions, exchanging data with the system's memory and/or peripherals, managing the system's other components, etc.

A cache 104 stores instructions and/or data addresses in cache lines for access by the processor 102. Such storage may be temporary, used for frequently accessed instructions and/or data addresses, and/or provide for relatively quick access to the accessed instructions and/or data addresses. A cache line may include an instruction that is delineated across multiple words, such as, for example, eight words. Of course, the instruction may be otherwise delineated. The cache line may also include one or more parity bits. In one instance, at least one parity bit is provided for each word in the cache line. As such, an eight word cache line may include eight parity bits.

The cache line may also include one or more extra bits that can be selectively used. For instance, such bits may be used when a defect corrupts one or more bits in the cache line. As described in greater detail below, the one or more extra bits can be as flag bits that are set to invoke an attention signal to the processor 102 which can be suitably handled. As with the parity bits, each word may be associated with at least one extra bit. As such, an eight word cache line may include eight parity bits and eight extra bits. By way of non-limiting example, the cache line may include 73 or more bits, wherein 64 bits are used for eight words, 8 bits are used for eight parity bits, and at least one bit, for example, the 73rd bit, is used as the extra bit. Of course, other words sizes, including, but not limited to 8, 9, 12, 18, 24, 32, 36, 39, 40, 48, 60, and 64 bits may be used.

As shown, the cache 104 includes at least one instruction-side (I-side) cache 106 and/or at least one data-side (D-side) cache 108. However, the cache 104 may additionally or alternatively include one or more other caches such as general-purpose caches, etc. As known, general-purpose caches may be designated by level, such as L0, L1, and L2 for level 1, level 2, and level 3 caches, I-side caches may be designated as L0I, L1I, and L2I for level 1, level 2, and level 3 instruction-only caches, and D-side caches may be designated as L0D, L1D, and L2D for level 1, level 2, and level 3 data caches.

When the processor 102 fetches an instruction or data address, the processor 102 first checks the cache 104. If a cache line in the cache 104 includes a matching address, the processor 102 reads the instruction and/or data address from the cache line in the cache 104. Otherwise, the processor 102 fetches the instruction and/or data address from main memory 110 or a higher level cache. The fetched instruction and/or data address may be placed in the cache 104. If placed in the cache 106 and the instruction and/or data address is subsequently desired, the processor 102 can fetch the instruction and/or data address for the cache 104.

A queue 112 queues instruction and data addresses for the processor 102. For instance, an instruction or data address may be fetched from the cache 106 and temporarily stored in the queue 112 for subsequent processing by the processor 102. As discussed in greater detail below, when instruction and data addresses are sent to the queue 112 and/or the processor 102, corresponding overloaded parity bits, if any, are sent along with the instruction and data addresses.

An address comparison register 114 stores addresses of interest. By way of non-limiting example, such addresses may correspond to addresses associated with breakpoints. The processor 102 compares addresses in the cache with addresses in the address comparison register 114. In one instance, the processor 102 is configured such that when an address in the cache matches an address in the address comparison register 114 the processor 102 switches context and executes a preset action, such as, for example, generating a breakpoint.

An action register 116 stores one or more preset actions that are executed when an address in the cache matches an address in the address comparison register 114. As noted above, an example preset action is for the processor 102 to generate a breakpoint interrupt. Of course, one or more other actions may be included in the action register 116.

A parity register 118 stores information indicative of whether parity checking and generation are to be performed and/or whether the parity bits are to be overloaded. For example, the parity register 118 may include one or more bits that can be set to enable or disable parity checking. The processor 102 checks the parity register 118 to determine whether parity checking and generation is to be performed. It is to be appreciated that the parity register 118 can be otherwise used.

Figure 2:
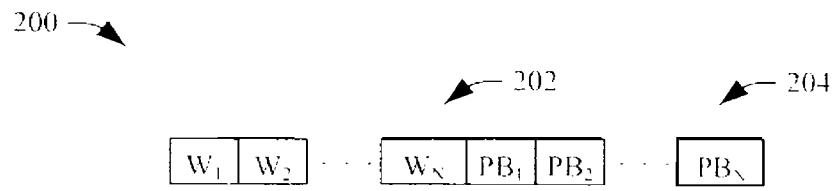
FIG. 2 illustrates an example cache line.

The following discussion assumes that the value in the parity register 118 indicates that parity generation and checking should not be performed. It is also assumed that instruction and/or data addresses of interest are included in the address comparison register 114. As noted above, such addresses may correspond to instruction and/or data addresses marked with a breakpoint. It is also assumed that a desired action(s) for the instruction and/or data addresses in the address comparison register 114 is included in the action register 116. Furthermore, FIG. 2 shows an example of some suitable fields that may be included in each cache line. As shown, a cache line 200 may include at least include N words 202 ($W_1$-$W_N$) and N parity bits 204 ($PB_1$-$PB_N$), wherein N is an integer equal to or greater than one, for example, eight. In this example, each of the parity bits 204 corresponds to a different one of the words 202.

Returning to FIG. 1, in operation the processor 102 checks the parity register 118 to determine whether parity generation and checking should be performed. As noted above, in this example, parity generation and checking is disabled. When fetching a word from a cache line 200 in the cache 104, the processor 102 compares the corresponding address with the addresses in the address comparison register 114. If a match is found, the processor 102 sets the corresponding parity bit 204 in the cache line 200. For example, if the address for the ith word 202 in the cache line 200 matches an address in the address comparison register 114, then the processor 102 sets the ith parity bit 204.

The instruction or data address, along with the corresponding parity bit 204, are sent to the queue 112 or directly to the processor 102 for processing by the processor 102. When the processor 102 processes the instruction or data address, the set parity bit 204 invokes an action or attention signal. The processor 102 determines a suitable action from the action register 116. As noted above, the action may be to set trap to generate a hardware breakpoint interrupt. As such, when the instruction or data address is processed an exception is thrown. In another instance, the exception is thrown before the instruction or data address is processed.

Figure 3:
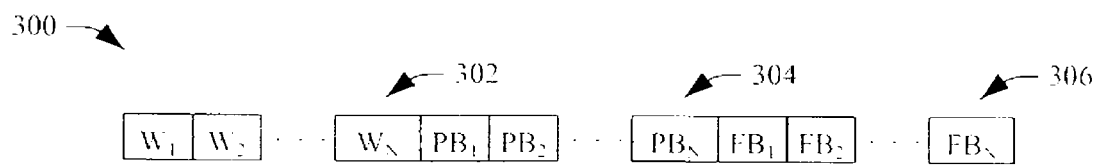
FIG. 3 illustrates an example cache line including a flag bit.

In an alternative implementation, the parity register 118 is omitted or not used. Instead, one or more bits such as extra bits in the cache line are used to indicate whether parity generation and checking should be performed for a particular word in the cache line. An example of implementing this is shown in conjunction with FIG. 3. As shown, a cache line 300 may include at least include N words 302 and N parity bits 304, similar to the cache 200. In addition, the cache line 300 includes N flag bits ($FB_1$-$FB_N$) 306. The flag bits 306 are used to indicate whether parity generation and checking should be performed for a corresponding word 302. In this example, each of the flag bits 306 and each of the parity bits 304 correspond to one of the words 302.

When using the flag bits 306, the processor 102 fetches a word 302 from a cache line 300 in the cache 104 and checks its corresponding flag bit 306. If the flag bit 306 is set to indicate that parity generation and checking is disabled for the word 302, the processor 102 compares the corresponding address with the address(es) in the address comparison register 114. If a match is found, the processor 102 sets the corresponding parity bit 304 in the cache line 300. For example, if the address for the ith word 302 in the cache line 300 matches an address in the address comparison register 114, then the processor 102 sets the ith parity bit 304. If, alternatively, the flag bit 306 is set to indicate that parity generation and checking is enabled for the word 302, then the processor 102 does not override the parity bit 304.

The instruction or data address, along with the corresponding parity bit 304, are then sent to the queue 112 for processing by the processor 102 or directly to the processor 102 for processing. When the processor 102 processes the instruction or data address, the set parity bit 304 invokes an action or attention signal. As described above, the processor 102 determines a suitable from the action register 116, and a suitable action includes setting a trap to generate a hardware breakpoint interrupt to interrupt the processing 102 before, during or after the processor 102 processes the instruction or data.

Figure 4:
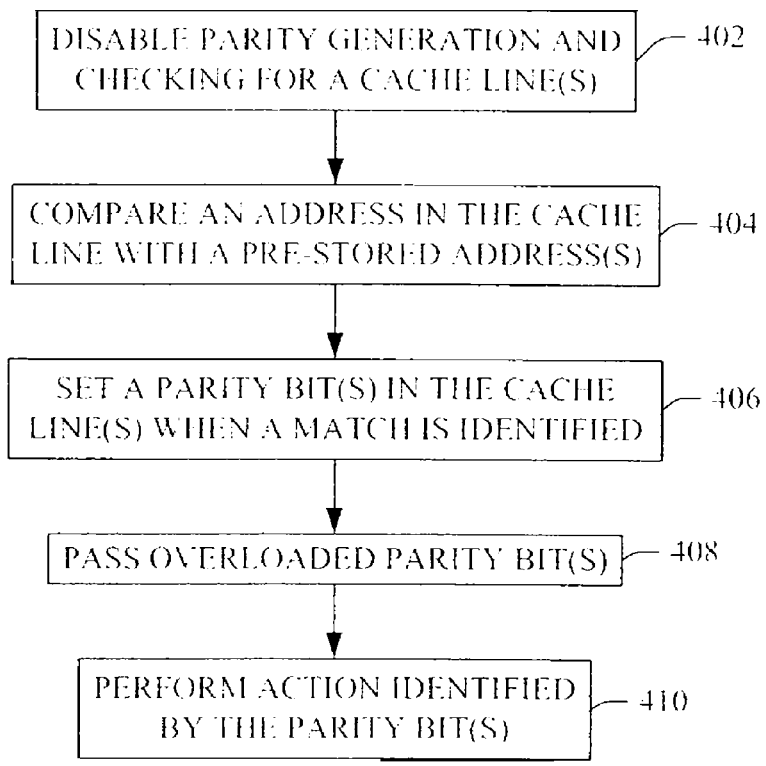
FIG. 4 illustrates a method for overloading a parity bit.

FIG. 4 illustrates a method for overloading the function of a cache parity bit. At reference numeral 402, parity generation and checking is disabled for at least a portion of one or more cache lines. For instance, parity generation and checking can be globally disabled for all cache lines. In another instance, parity generation and checking can be disabled for a particular cache line. In another instance, parity generation and checking can be disabled for a particular byte, word etc. in a cache line. As noted above, in one example parity generation and checking is disabled by suitably setting one or more bits in the parity register 118, while in another example, it is disabled by suitably setting one or more bits in each cache line. It is to be understood that these examples are not exclusive as other techniques are also contemplated herein.

At 404, an address in a cache line in which parity generation and checking is disabled is compared with one or more addresses of interest in the address comparison register 116. At noted above, addresses of interest can be pre-determined and included in the address comparison register 116. At 406, if the address of the cache line matches an address in the address comparison register 116, one or more parity bits in the cache line are set (or overloaded) to indicate that a predetermined action is to occur before, during or after processing of the cache line. For instance, the one or more parity bits may be set to indicate that a trap should occur when a byte, word, etc. is used. As such, address calculations, which generate the overloaded on/off parity bits, may occur while the cache load operation is waiting for data to come back from higher level cache or mainstore. This may take the comparison out of the direct usage path since it is precalculated.

At 408, when the cache line access for a marked cache line occurs, the overloaded parity bits are passed along to the instruction or date cache logic. For I-side fetches, this may result in an extra bit being passed for each instruction word. For D-side loads or stores, intermediate fill buffers or other logic may need to see the parity bits. At 410, when the I or D side logic sees a set parity bit, the corresponding action is performed. For instance, where the action includes setting a trap, a corresponding hardware breakpoint interrupt is generated. In one implementation, parity is ignored for dirty lines, which may be flushed from the D-cache, if the cache line has been marked such that is has overloaded function.

Figure 5:
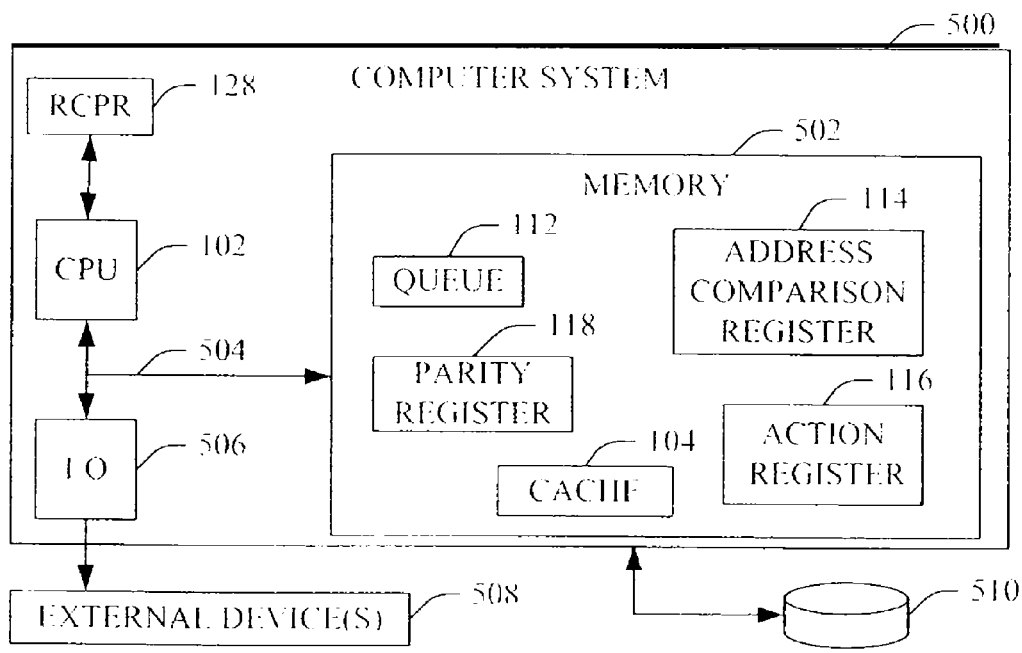
FIG. 5 illustrates an example of a computer system in which the method can be employed.

Referring now to FIG. 5, an exemplary computer system 500 in which the system 100 can be utilized with is illustrated. As shown, the computer system 500 includes the processor (CPU) 102, memory 502, a bus 504, and input/output (I/O) interfaces 506. The memory 502 includes the parity register 118 (when included), the address comparison register 114, the action register, the queue, and the cache 104.

The computer system 500 is shown in communication with external devices 508 and an external storage system 510. The external devices 528 can comprise any devices (e.g., keyboard, pointing device, display, etc.) that enable a user to interact with computer system 500 and/or any devices (e.g., network card, modem, etc.) that enable computer system 500 to communicate with one or more other computing devices. The external storage system 510 includes memory such as a hard disk, a floppy disk, portable memory, etc.

In general, the CPU 102 processes one or more instructions in one or more cache lines. For an instruction, the CPU 102 determines whether, for a particular portion (e.g., a word, the whole instruction, etc.) of the instruction, parity generation and checking has been disabled, or overloaded. If so, the CPU 102 determines whether the portion of the instruction has a corresponding preset action, for example, by comparing the address of the portion of the instruction with one or more pre-stored addresses. If the address of the portion of the instruction matches a pre-stored address, then the CPU 102 performs the corresponding action. As described above, the action may be generation of a breakpoint or other desired action.

Figure 6:
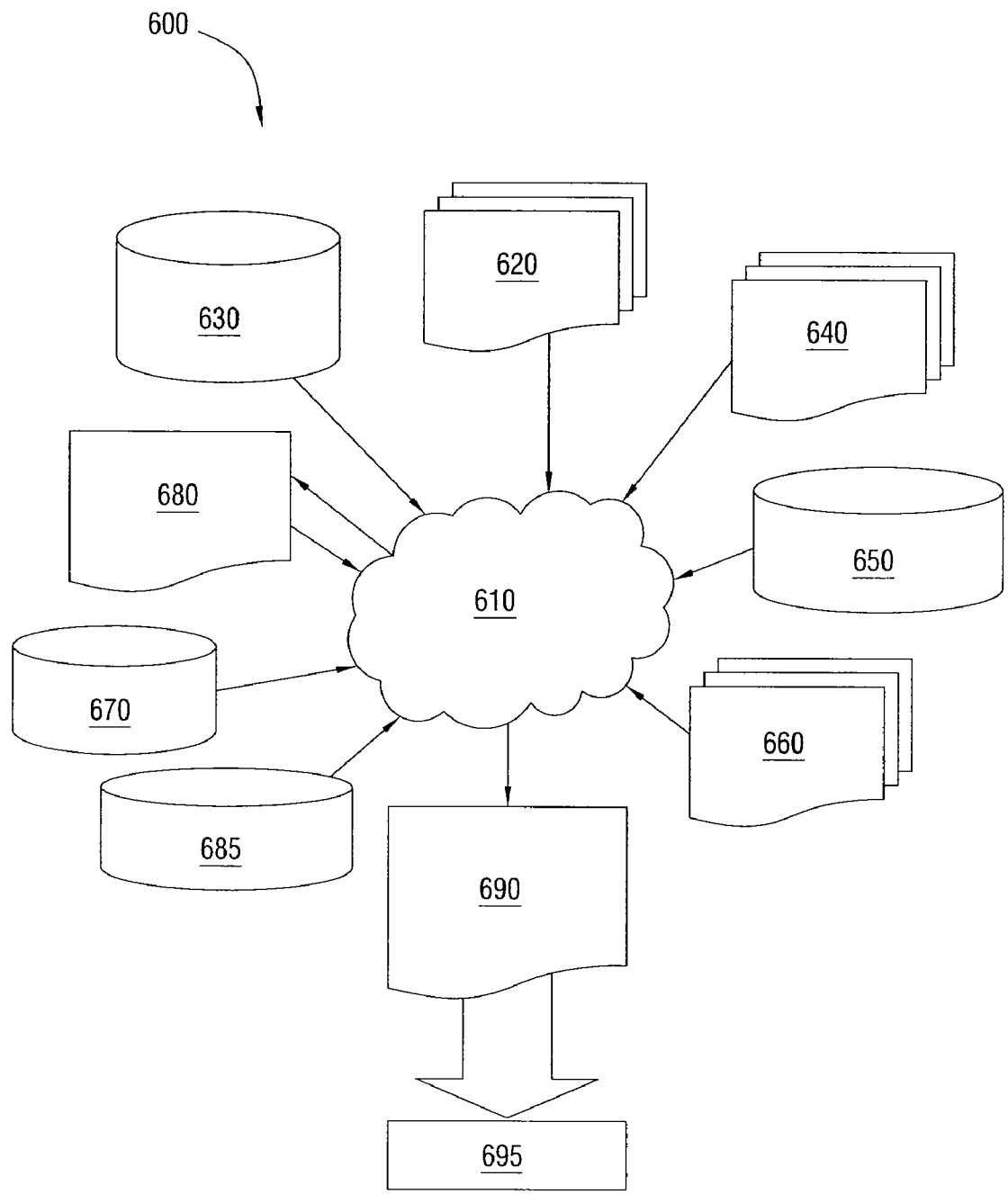
FIG. 6 is a flow diagram of a design process used in semiconductor design, manufacture, and/or test.

FIG. 6 shows a block diagram of an exemplary design flow 600 used for example, in semiconductor design, manufacturing, and/or test. Design flow 600 may vary depending on the type of IC being designed. For example, a design flow 600 for building an application specific IC (ASIC) may differ from a design flow 600 for designing a standard component. Design structure 620 is preferably an input to a design process 610 and may come from an IP provider, a core developer, or other design company or may be generated by the operator of the design flow, or from other sources. Design structure 620) comprises the circuits described above and shown in FIGS. 1 and 5 in the form of schematics or HDL, a hardware-description language (e.g., Verilog, VHDL, C, etc.). Design structure 620 may be contained on one or more machine readable medium. For example, design structure 620 may be a text file or a graphical representation of a circuit as described above and shown in FIGS. 1 and 5. Design process 610 preferably synthesizes (or translates) the circuit described above and shown in FIGS. 1 and 5 into a netlist 680, where netlist 680 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 680 is resynthesized one or more times depending on design specifications and parameters for the circuit.

Design process 610 may include using a variety of inputs; for example, inputs from library elements 630 which may house a set of commonly used elements, circuits, and devices, including models, layouts, and symbolic representations, for a given manufacturing technology (e.g., different technology nodes, 32 nm, 45 nm, 90 nm, etc.), design specifications 640, characterization data 650, verification data 660, design rules 670, and test data files 685 (which may include test patterns and other testing information). Design process 610 may further include, for example, standard circuit design processes such as timing analysis, verification, design rule checking, place and route operations, etc. One of ordinary skill in the art of integrated circuit design can appreciate the extent of possible electronic design automation tools and applications used in design process 610 without deviating from the scope and spirit of the invention. The design structure of the invention is not limited to any specific design flow.

Design process 610 preferably translates a circuit as described above and shown in FIGS. 1 and 5, along with any additional integrated circuit design or data (if applicable), into a second design structure 690. Design structure 690 resides on a storage medium in a data format used for the exchange of layout data of integrated circuits (e.g. information stored in a GDSII (GDS2), GL1, OASIS, or any other suitable format for storing such design structures). Design structure 690 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1 and 5. Design structure 690 may then proceed to a stage 695 where, for example, design structure 690: proceeds to tape-out, is released to manufacturing, is released to a mask house, is sent to another design house, is sent back to the customer, etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A design structure embodied in a machine readable storage medium for at least one of designing, manufacturing, and testing a design, the design structure comprising:
    a system, comprising:
        a cache that stores information in a cache line for processing, wherein the cache line includes at least a first field configured to store an instruction or data and at least a second field configured to store parity information;
        a parity register that includes a parameter indicative of whether parity generation and checking is disabled for the information in the cache line; and
        a processor that sets the second field in the cache line to include a value, which indicates a corresponding action to be performed, when the parameter in the parity register indicates that parity generation and checking is disabled for the cache line.

2. The design structure of claim 1, wherein the action includes generating a hardware breakpoint interrupt.

3. The design structure of claim 1, wherein the cache line is part of one of general cache, instruction cache and data cache.

4. The design structure of claim 1, further including an address comparison register, wherein the processor sets the second field only when an address in the cache line matches an address in the address comparison register.

5. The design structure of claim 1, wherein the information in the second field is provided to the processor with the information in the first field.

6. The design structure of claim 1, wherein the value in the second field overrides parity information.

7. The design structure of claim 1, wherein the design structure comprises a netlist, which describes the system.

8. The design structure of claim 1, wherein the design structure resides on the machine readable storage medium as a data format used for the exchange of layout data of integrated circuits.

9. A design structure embodied in a machine readable storage medium for at least one of designing, manufacturing, and testing a design, the design structure comprising:
    a system, comprising:
        a cache that stores information in a cache line for processing, wherein the cache line includes:
            at least a first field configured to store an instruction or data;
            at least a second field configured to store parity information; and
            at least a third field configured to store a parameter indicative of whether parity generation and checking is enabled for the first field; and
        a processor that sets the second field in the cache line to include a value, which indicates a corresponding action to be performed, when the parameter in the third field indicates that parity generation and checking is disabled.

10. The design structure of claim 9, wherein the action includes setting a trap.

11. The design structure of claim 9, wherein the cache line is part of an instruction-side or a data-side cache.

12. The design structure of claim 9, further including an address comparison register, wherein the processor sets the second field only when an address in the cache line matches an address in the address comparison register.

13. The design structure of claim 9, wherein the cache line includes eight words of information, eight corresponding parity bits, and eight corresponding flag bits, wherein each flag bit indicates whether parity generation and checking is disabled for a corresponding word of the eight words.

14. The design structure of claim 13, wherein each flag bit is sent to the processor.

15. The design structure of claim 9, wherein the design structure comprises a netlist, which describes the system.

16. The design structure of claim 9, wherein the design structure resides on the machine readable storage medium as a data format used for the exchange of layout data of integrated circuits.

* * * * *